United States Patent [19]

Schutten et al.

[11] Patent Number: 4,821,205

[45] Date of Patent: Apr. 11, 1989

[54] SEISMIC ISOLATION SYSTEM WITH REACTION MASS

[75] Inventors: Herman P. Schutten, Whitefish Bay, Wis.; Arnold Weiss, Minneapolis, Minn.

[73] Assignee: Eaton Corporation, Cleveland, Ohio

[21] Appl. No.: 869,107

[22] Filed: May 30, 1986

[51] Int. Cl.[4] .............................................. F16M 13/00
[52] U.S. Cl. .................................... 364/508; 248/550; 248/638
[58] Field of Search ....................... 364/508, 550, 566; 248/550, 560–563, 665, 669, 637, 638, 636

[56] References Cited

U.S. PATENT DOCUMENTS

| | | | |
|---|---|---|---|
| 4,083,433 | 4/1978 | Geohegan, Jr. et al. | 188/113 |
| 4,101,102 | 7/1978 | Lloyd | 248/20 |
| 4,328,941 | 5/1982 | Phillips et al. | 248/550 |
| 4,336,917 | 6/1982 | Phillips | 248/550 |
| 4,483,425 | 11/1981 | Newman | 188/378 |
| 4,546,960 | 10/1985 | Abrams et al. | 267/136 |
| 4,615,504 | 10/1986 | Sandercock | 248/550 |

OTHER PUBLICATIONS

Morison et al., "Comparison of Optimized active and passive vibration absorbers," 1973, pp. 932–938, Automatic Control Conf. of the Amer. Automatic Control Council.

Primary Examiner—Parshotam S. Lall
Assistant Examiner—Thomas G. Black
Attorney, Agent, or Firm—C. H. Grace

[57] ABSTRACT

An active inertial isolation system is disclosed generally for any inertial body, and also for bodies subject to structural resonance, and further particularly for a microlithography system (2) for processing semiconductor wafers (4) subject to a submicron design rule. One or more linear forcers (94, 76, 74, 94' 76', FIGS. 18 and 19) are provided for applying a force between the body or worktable (6) and a reaction mass RM (202, 204, 206, 210). One or more accelerometers (98, 78) sense acceleration of the body (6) and apply force against sensed acceleration regardless of the position or variation of position of the body (6) relative to the reaction mass RM. The reaction mass RM may be supported relative to the linear forcer, and/or be a part thereof or rigidly fixed thereto, or the reaction mass RM may be supported relative to a reference such as a sidewall or the floor.

18 Claims, 7 Drawing Sheets $$\frac{x_1}{Kx_0 + C\dot{x}_0 + F_{reaction}} = \frac{1}{(m+k_m)S^2 + (k_c+C)S + K}$$

$$x_1 = \frac{Kx_0 + C\dot{x}_0 + F_{reaction}}{(m+k_m)S^2 + (k_c+C)S + K}$$

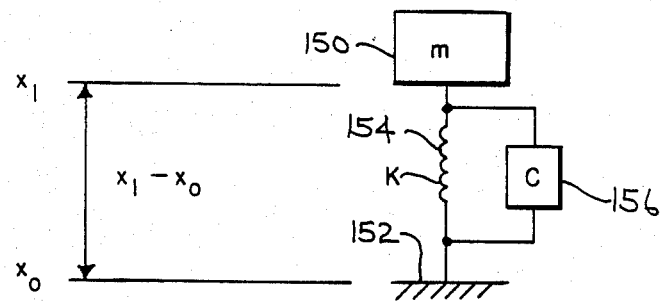
FIG. 14
$$F = m\ddot{x}_1 + C\dot{x}_1 + Kx_1$$
$$= (mS^2 + CS + K)x_1$$
$$x_1 = \frac{F}{mS^2 + CS + K}$$
FIG. 15
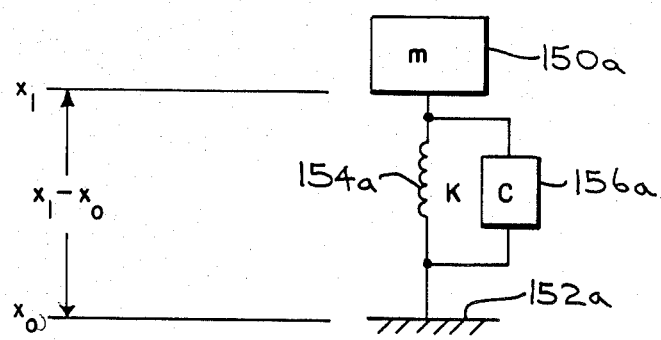
FIG. 16
$$F = m\ddot{x}_1 + C(\dot{x}_1 - \dot{x}_0) + K(x_1 - x_0)$$
$$m\ddot{x}_1 + C\dot{x}_1 + C\dot{x}_0 + Kx_1 + Kx_0$$
$$(mS^2 + CS + K)x_1 + (CS + K)x_0$$
let F=0
$$x_1 = \frac{(CS + K)x_0}{mS^2 + CS + K}$$
FIG. 17

SEISMIC ISOLATION SYSTEM WITH REACTION MASS

BACKGROUND AND SUMMARY

The invention arose from efforts to develop a microlithography system for processing semiconductor wafers subject to a submicron design rule, though the invention is applicable to a wide variety of uses where seismic isolation is essential, especially those requiring accuracy on an extremely small scale. The invention particularly arose from further development efforts regarding the system in co-pending application Ser. No. 06/735,319, now abandoned filed May 17, 1985.

In microlithography systems for micron and multi-micron design rule capability, the worktable of the system is isolated from floor motion to afford the required accuracy. To accomplish this isolation, systems typically employ a large inertial mass such as a granite block supported above the floor by soft springs such as air bags or air pistons that utilize the compressibility of a gas within a reservoir as the spring mechanism. Lateral isolation is accomplished by designing these vertical soft springs to have as little lateral compliance as possible.

Further miniaturization now requires microlithography systems having submicron design rule capability, such as 0.1 micron overlay accuracy and 0.5 micron resolution. The above noted traditional type isolation techniques are inadequate for the level of accuracy required in submicron systems.

Rather than passive isolation, the noted co-pending application instead or additionally provides inertially augmented active isolation. Furthermore, rather than position stabilization, the noted co-pending application provides force or acceleration counteraction regardless of relative floor position or motion, and variable changing thereof. These features are particularly provided in the present invention by movement of a reaction mass.

The noted co-pending application and the present invention are particularly advantageous in a step and repeat microlithography system where stage motion for each exposure causes a reaction force in its supporting worktable and in turn a vibrational quiver. The noted co-pending application and the present invention significantly reduce the resonant frequency and amplitude of worktable quiver, which in turn significantly reduces the delay time between exposures, and hence increases throughput.

BRIEF DESCRIPTION OF THE DRAWINGS

FIG. 14 is a schematic illustration of a generalized system.

FIG. 15 shows force equations for FIG. 14.

FIG. 16 shows a further generalized system like FIG. 14.

FIG. 17 shows force equations for FIG. 16.

DETAILED DESCRIPTION

Figure 1:
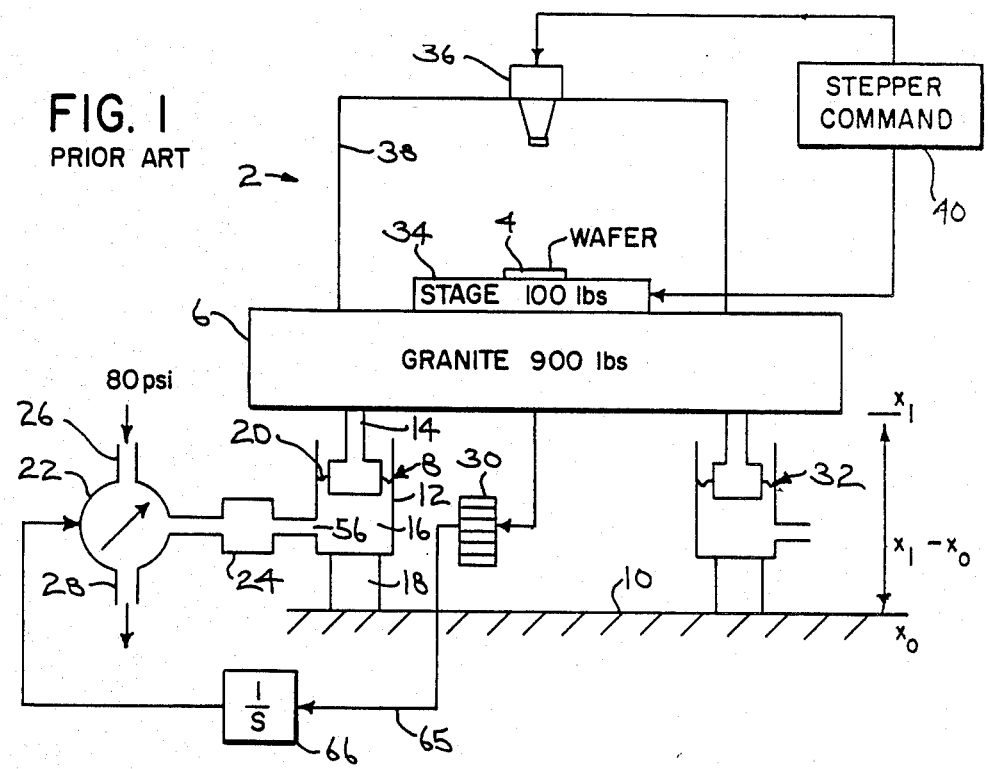
FIG. 1 is a schematic illustration of a prior art microlithography system.

FIG. 1 shows a known prior art microlithography system 2 for processing a semiconductor wafer 4. The system includes a worktable 6 at position $x_1$ having a large mass m such as a 900 pound graphite block. Resilient support means 8 supports worktable 6 on floor 10 for isolating the worktable from floor vibration. Floor 10 is at position $x_0$. Support 8 is typically a soft spring having a spring constant K provided by a pneumatic gas cylinder 12 having a piston 14 engaging the underside of worktable 6 and vertically slideable in cylinder chamber 16 which is fixed to the floor by supporting pedestal 18. A rubber bellows or rolling diaphragm 20 seals chamber 16 and provides lateral centering of the piston though it does have some lateral compliance to allow lateral motion. A three-way valve 22 is connected through accumulator 24 to chamber 16 for supplying high pressure gas such as nitrogen at 80 pounds per square inch at input port 26 to chamber 16 to drive piston 14 upwardly. The gas may be controllably vented at exhaust port 28 to allow downward movement of piston 14. Valve 22 is controlled by a position reference such as potentiometer 30 giving the position of worktable 6 relative to floor 10 i.e., $x_1 - x_0$. Worktable 6 is typically a rectangular member and is supported at all four corners by like supports such as 32.

A stage 34, typically 35 to 100 pounds, is on worktable 6 for supporting semiconductor wafer 4. A projector 36 with appropriate optics is supported by frame or tower 38 on worktable 6 above stage 34 for exposing wafer 4. Stage 34 is laterally movable relative to worktable 6 and projector 36 to enable exposure of different portions of wafer 4. Stepper command 40 controls movement of stage 34 and exposure by projector 36. Projector 36 is typically about three feet above the worktable and reduces the image by a factor of ten to place a one centimeter exposed image on the wafer. A six inch wafer would typically require about 180 exposures with a step and repeat method.

Figure 2:
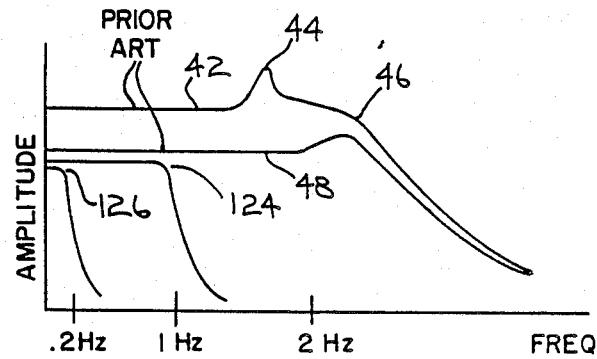
FIG. 2 is a graph showing frequency versus amplitude of the response of the worktable of the system of FIG. 2 to floor motion.

FIG. 2 shows vibration transmissibility of the system of FIG. 1, plotting frequency versus amplitude response of worktable 6. Curve 42 shows a resonant peak at 44 and then a roll-off or damping at 46 at about two hertz. Curve 48 shows a known improvement where the amplitude of the vibration is reduced as well as the resonant peak, but the resonant frequency is about the same, i.e., there is no significant roll-off or damping until beyond two hertz.

Figure 3:
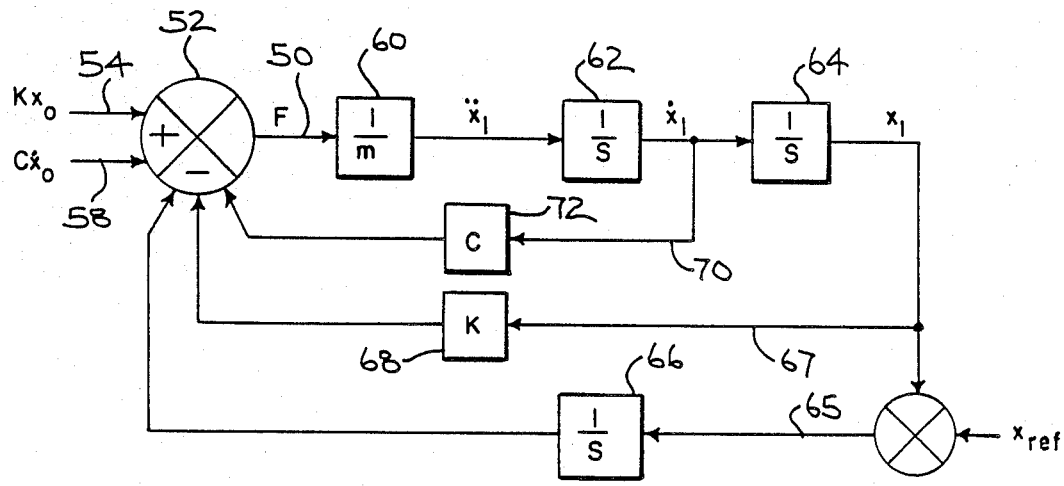
FIG. 3 is a block diagram of the system of FIG. 1.

FIG. 3 shows a block diagram for the system of FIG. 1. The force 50 on worktable 6 is the summation of the various forces acting on it, as shown at the inputs to summer 52. One of these forces is the spring constant K of soft spring support 8 multiplied by the distance or floor displacement $x_0$, as shown at 54. Another force is the pumping pressure or loss C of the gas through orifice 56. This force is a function of gas flow velocity and is thus C multiplied by the floor velocity $\dot{x}_0$, as shown at 58, and provides damping. The force 50 on the worktable is divided by its mass m at 60, yielding acceleration $\ddot{x}_1$ of worktable 6, which in turn is integrated with respect to time at 62 to yield velocity $\dot{x}_1$, which in turn is integrated with respective time at 64 to yield distance or displacement $x_1$ of worktable 6. Displacement $x_1$ as measured by potentiometer 30 is compared to a set point $x_{ref}$, any error is integrated at 66 in loop 65 to provide the steady-state pressure needed by support means 8 to support the worktable. Displacement $x_1$ is fed back in loop 67 by the spring constant K at 68 of support means 8, back to summer 52. Likewise the velocity $\dot{x}_1$ is fed back in loop 70 to couple a pumping loss or damping component at 72 back to summer 52. It has been known in the prior art to fine tune the system of FIG. 1 by controlling the spring constant K and pumping losses C to improve performance from curve 42 of FIG. 2 to curve 48.

Figure 4:
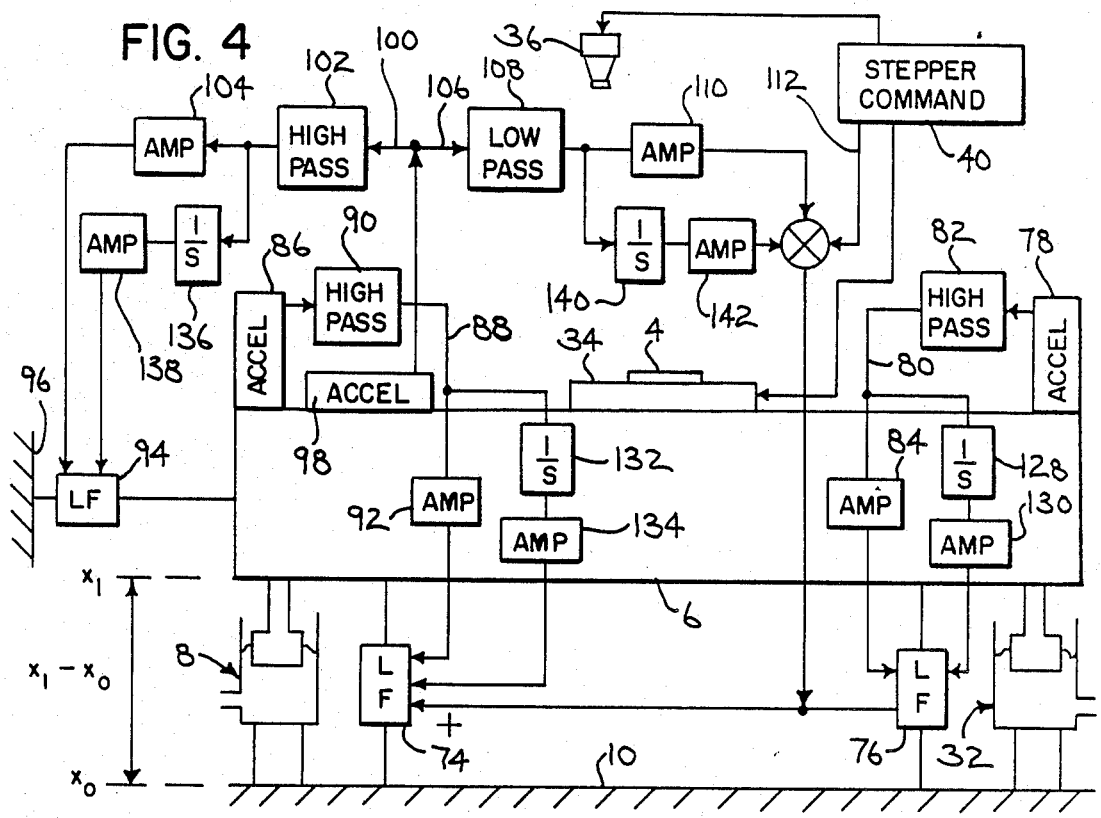
FIG. 4 is a schematic illustration of a microlithography system in accordance with the noted co-pending application.

FIG. 4 shows a microlithography system in accordance with the noted co-pending application and uses like reference numerals as FIG. 1 where appropriate to facilitate clarity. Force applying means is provided by a linear forcer or linear motor, such as supplied by Northern Magnetics, Inc., 16124 Wyandotte Street, Van Nuys, Calif. 91406, called Normag DC linear motor, for applying force between floor 10 and worktable 6. It is preferred that each support such as 8 and 32 have a linear forcer such as 74 and 76 adjacent thereto, though other combinations are of course possible with more or less forcers than supports, and various combinations of four point suspensions, three point suspensions, one point suspension, and so on. Accelerometer means such as 78 is mounted or otherwise operatively coupled to worktable 6 to sense vertical acceleration of the worktable and is operatively coupled in feedback loop 80 to linear forcer 76 to actively isolate worktable 6 by applying force against sensed acceleration regardless of the position or movement of worktable 6 or variance thereof relative to floor 10. High pass filter means 82 is connected between accelerometer 78 and linear forcer 76 for passing only higher frequency components above low frequency DC type components such as constant gravity induced acceleration. High pass filter 82 may be a separate component or may be inherent in accelerometer 78. For example, a piezoelectric accelerometer typically has no DC or low frequency response and inherently passes only high frequency components. A strain gauge, however, does have DC low frequency response, and a separate high pass filter is then used. Feedback loop 80 has a feedback loop gain $k_m$ controlled by amplifier 84. Accelerometer 86, feedback loop 88, high pass filter 90, and amplifier 92 are comparable.

Another linear forcer 94 is provided for applying horizontal force between a sidewall reference 96 and worktable 6. A horizontal accelerometer 98 is connected to worktable 6 to sense horizontal acceleration of the worktable and is operatively coupled through feedback loop 100 with high pass filter 102, and amplifier 104 to horizontal linear forcer 94 for passing only higher frequency components thereto. Other horizontal accelerometers (not shown) are also connected to the worktable at other corners and at 90° orientation relative to accelerometer 98.

Horizontal accelerometer 98 is also coupled by a feedback loop 106 through a low pass filter 108, and amplifier 110 to vertical linear forcers 74 and 76 for passing only lower frequency components thereto, including DC and constant gravity induced acceleration, to supplement the higher frequency components from loops 88 and 80 from vertical accelerometers 86 and 78, to compensate tilting of worktable 6 upon lateral shifting of stage 34 changing the center of gravity of the system. In the embodiment in FIG. 4, vertical linear forcers 74 and 76 are offset from the center of gravity of the system, and the output of horizontal accelerometer 98 through feedback loop 106 and low pass filter 108 is added to linear forcer 74 and subtracted from linear forcer 76 on the opposite side of the center of gravity of the system. Stepper command 40, which coordinates lateral movement of stage 34 for exposure by projector 36 as in FIG. 1, may also be operatively coupled at 112 to feedback loop 106 and vertical linear forcers 74 and 76 to apply a predictive correction signal thereto knowing beforehand the direction and displacement of lateral movement of the stage, to further compensate tilting of worktable 6 caused by lateral stage movement.

Figure 5:
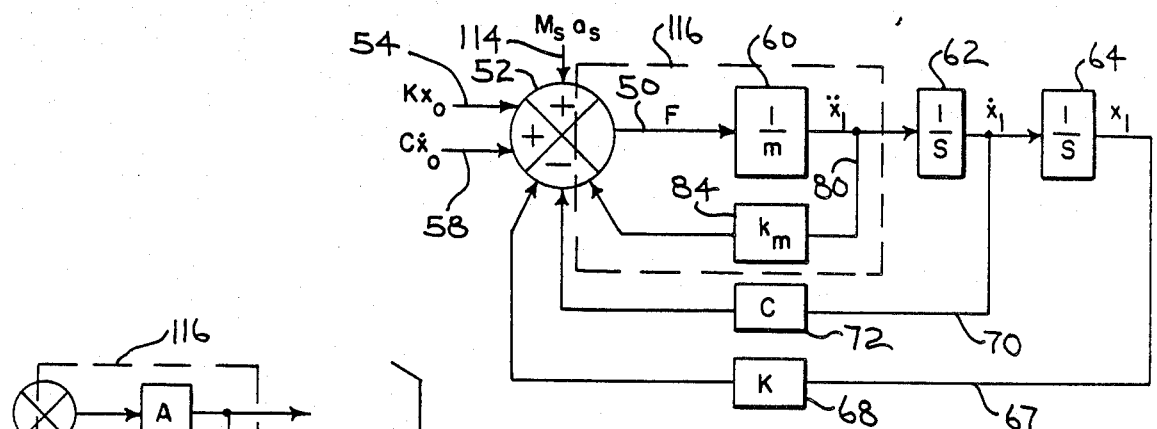
FIG. 5 is a block diagram of the system of FIG. 4.

FIG. 5 shows a block diagram of FIG. 4, comparably to FIGS. 3 and 1, and like reference numerals are used where appropriate to facilitate clarity. Another force being summed in summer 52 is shown at 114, which is the stage force due to the mass of the stage $M_s$ multiplied its acceleration as during the step and repeat process. Sensed acceleration $\ddot{x}_1$ of the worktable is fed back in loop 80 with gain $k_m$ for the vertical linear forcer loop. The block diagram for the horizontal linear forcer feedback loop would be the same. The acceleration feedback loop shown in dashed line box 116 in FIG. 5 is reproduced in simplified form in FIG. 6 with a forward loop factor A and a feedback loop factor B. According to standard loop transformation, the loop in box 116 is equivalent to that shown in box 118. Substituting in the value for A as 1/m, and the value for B as $k_m$, results in box 120, which by algebraic rearrangement yields box 122. Box 122 may thus be substituted for box 116 in FIG. 5. It is thus seen that the mass m of worktable 6 as shown in box 60 in FIG. 5 has now been effectively increased to a dynamic mass which is equal to $m+k_m$. The dynamic mass has been increased without increasing the spring constant K of the supports such as 8, and without increasing the static mass. Furthermore, since the resonant frequency is proportional to the square root of the ratio of the spring constant K to the mass m, the resonant frequency of worktable 6 is reduced by a factor of $\sqrt{m+k_m}$. This is particularly significant in a step and repeat system. For example, if the loop gain $k_m$ is selected such that $m+k_m=4$ m, then the resonant frequency is cut in half, as shown at curve 124 in FIG. 2. If the loop gain $k_m$ is such that $m+k_m=100$ m, then the resonant frequency is reduced by a factor of 10, as shown at curve 126 in FIG. 2. By increasing the dynamic mass of worktable 6 and reducing its resonant frequency below the significant floor vibration frequencies, the amplitude of worktable quiver due to coupled floor motion is reduced. Furthermore, internal reaction forces such as those due to stage motion cause significantly less worktable motion. This in turn enables a much faster step and repeat process, increasing throughput. This is important because semiconductor processing equipment is very expensive, and, for example, doubling the throughput saves the cost of a second system.

Upon comparing FIGS. 4 and 1, it will be noted that the noted co-pending application system may provide an add-on system for an existing soft spring supported large mass worktable in a microlithography system. The soft spring supports such as 8 and 32 are augmented with linear forcers such as 74 and 76 having a substantially lower supporting capability than the soft spring supports and applying force to worktable 6 at floor vibration frequencies. In FIG. 1, a typical spring constant K for the supporting means for worktable 6 is about 400 pounds per inch. Thus in a four point suspension system with a soft spring support such as 8 at each corner of a rectangular member, each soft spring 8 has a spring constant K of 100 pounds per inch. Referring to FIG. 4, it is not necessary that linear forcer 74 have this same supporting capability. In fact, the noted co-pending application system enables linear forcer 74 to have a much lower supporting capability, which is desirable because the cost of a linear forcer increases with increasing supporting capability. It is only necessary that the floor or worktable motion stay within a selected range. For example, if soft spring support 8 has a 100 pound per inch spring constant K, and a 10 pound linear forcer 74 is used, the floor can move 0.1 inch before being out of range. If a 50 pound forcer is used, the floor can move 0.5 inch, and so on. If the spring rate of support 8 is reduced for example to 50 pounds per inch, and a 50 pound forcer 74 is used, the range of movement is one inch. Floor motion versus frequency is thus no longer a limiting factor, but instead the range of movement is. The cost of retrofitting existing equipment with the noted co-pending application system to increase throughput is dramatically less than the cost of a second system.

The noted co-pending application system overcomes the current compromise situation regarding selection of spring stiffness; namely, the apparently heretofore incompatible aspects of stiffness to prevent tilt, yet softness to isolate floor motion. Lateral movement of stage 34 shifts the center of gravity of the system, which causes tilting. Previously, two things could be done. The spring constant K of support 8 could be made stiff enough so that the lateral displacement of stage 34 doesn't cause a significant tilt. However, the trade-off with a stiff spring is increased coupling of floor motion to worktable 6, which defeats the purpose of isolation. Alternatively, the gas valve 22 feedback system could be made more sensitive and fast enough to pump gas into chamber 16 to prevent the tilt. However, this sensitive fast response would also be sensitive to floor motion and rapidly couple floor vibration to the worktable, which again defeats the purpose of isolation. The noted co-pending application system overcomes this dilemma and provides the stiffness needed in response to center of gravity displacement, and does so without changing the spring constant K. The noted co-pending application system further provides a very low breakpoint or resonant frequency, FIG. 2, below significant floor vibration frequencies, such that the latter are severely attenuated.

Rather than position stabilization, the noted co-pending application system instead or additionally provides force or acceleration counteraction and feeds back sensed acceleration $x_1$ independent of position, independent of floor reference motion, and independent of variation of each. The vertical isolation system isolates the worktable against low frequency unbalances such as shifts in the location of the center of mass of the system due to stage motion, isolates the worktable against high frequency reaction forces such as those due to the vertical component of stage motion acceleration, and isolates the worktable against floor vibration induced forces. The horizontal isolation system isolates the worktable against low frequency reaction forces, high frequency reaction forces due to stage acceleration, and lateral forces induced by horizontal floor vibration. As noted above, these forces have traditionally presented apparently contradictory system mechanization requirements. Maximum isolation of the worktable from its environment, such as the floor, implied minimum damping of internally generated reaction force induced worktable motions. Actually, these requirements are not contradictory and are now concurrently enabled by the noted co-pending application system.

Figure 7:
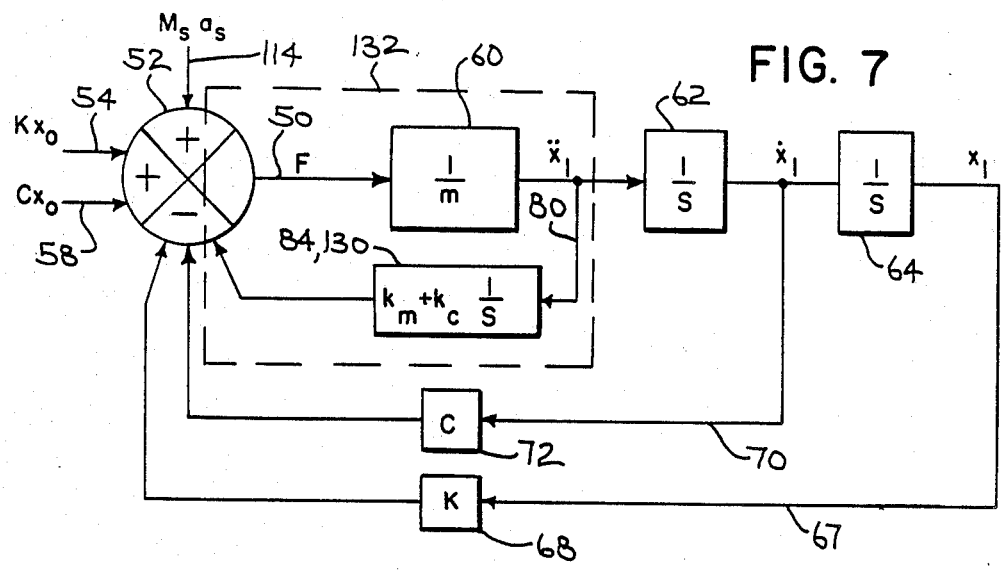
FIG. 7 is a block diagram like FIG. 5 showing control of the system of FIG. 4 incorporating a further improvement.

In a further improvement in accordance with the noted co-pending application, the sensed vertical acceleration from accelerometer 78, FIG. 4, in feedback loop 80 is integrated at 128 and operatively coupled with positive gain $k_c$ controlled by amplifier 130 to linear forcer 76 to inertially derive and increase damping of worktable 6 without increasing stiffness of the coupling support provided by soft spring support 32, i.e., without increasing damping constant C. The preferred embodiment eliminates damping coefficient C and relies on the inertially derived damping entirely. Thus, floor motion is not coupled through C to the worktable. The loop gain in feedback loop 80, FIG. 7, is a factor of $k_m + k_c 1/S$, i.e., $k_m$ plus the quantity $k_c$ times the integral with respect to time of the acceleration $\ddot{x}_1$. A single amplifier may provide the function of amplifiers 84 and 130 if further upstream in the feedback loop, though the dual amplifiers are preferred in order to individually control the loop gain contribution factors $k_m$ and $k_c$, which are respectively the acceleration component gain factor for increasing dynamic mass and the velocity component gain factor for inertially increasing dynamic damping. The sensed acceleration from vertical accelerometer 86 is likewise integrated at 132 and operatively coupled with feedback gain at 134 to linear forcer 74. The sensed acceleration from horizontal accelerometer 98 in feedback loop 100 is likewise integrated at 136 and operatively fed back with gain at 138 to horizontal linear forcer 94. Sensed acceleration from horizontal accelerometer 98 in feedback loop 106 is also integrated at 140 and fed back with gain at 142 to vertical linear forcers 74 and 76.

Figure 6:
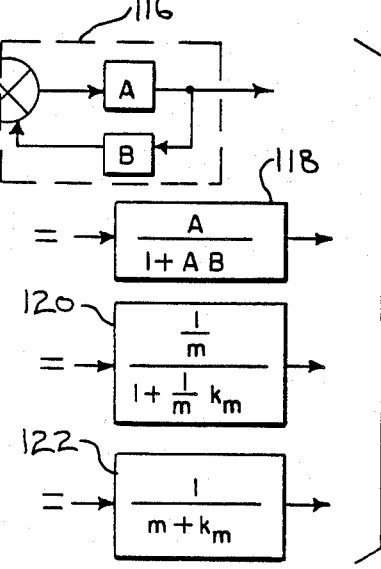
FIG. 6 is a block diagram of a portion of FIG. 5.
Figure 8:
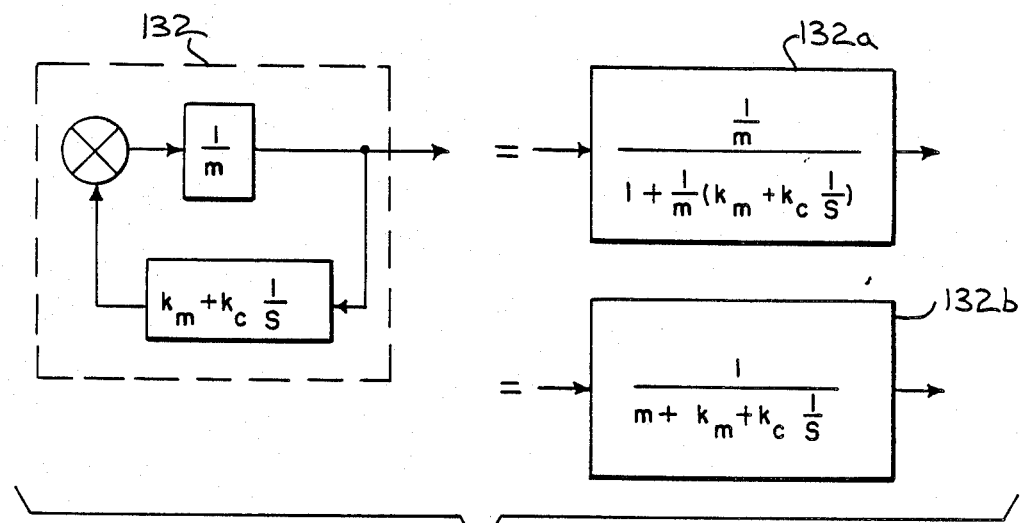
FIG. 8 is a block diagram of a portion of FIG. 7.

FIG. 7 shows the block diagram of FIG. 4, comparably to FIG. 5, and to FIGS. 3 and 1, and like reference numerals are used where appropriate to facilitate clarity. The feedback loop in dashed box 132 in FIG. 7 is also shown in dashed box in FIG. 8 where the forward loop factor A of FIG. 6 is 1/m, and the return feedback loop factor B of FIG. 6 is $k_m + k_c 1/S$ Using the loop transformation of FIG. 6 between boxes 116 and 118, dashed box 132 of FIG. 8 is rewritten as shown to the right thereof at box 132a. Algebraic rearrangement yields box 132b. Box 132b is the equivalent of box 132 and is substituted for box 132 in FIG. 7, yielding FIG. 9.

Figure 9:
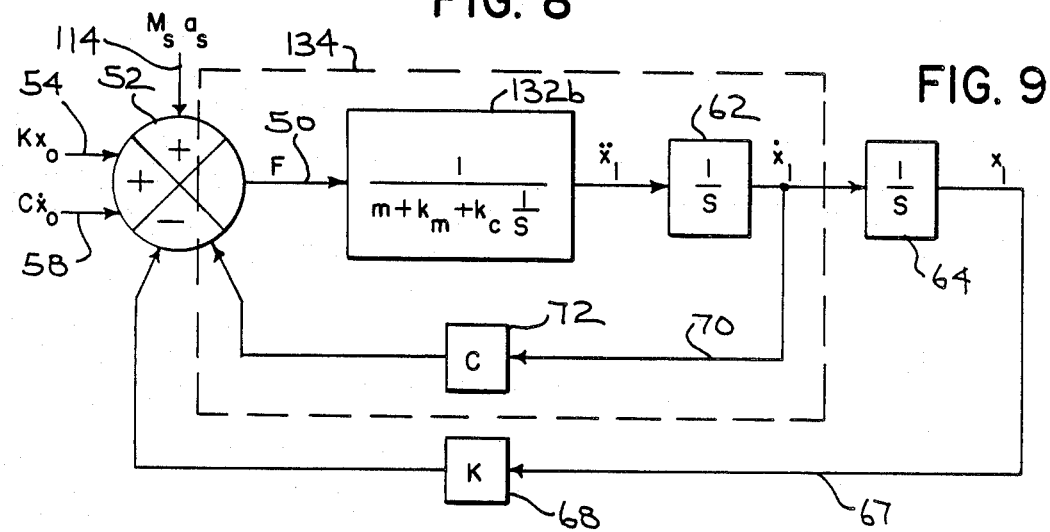
FIG. 9 is a further block diagram of FIG. 7.
Figure 10:
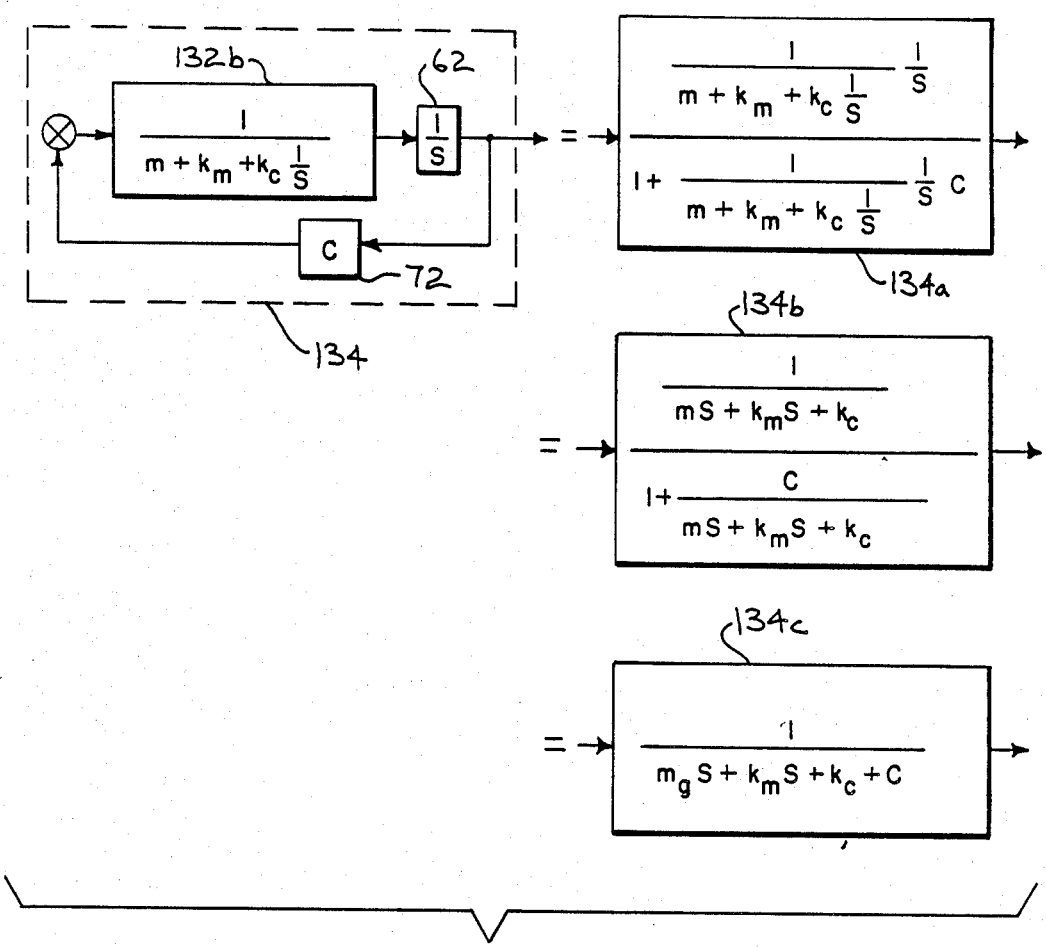
FIG. 10 is a block diagram of a portion of FIG. 9.

Dashed box 134 in FIG. 9 is shown in FIG. 10 and the forward loop factor A, per FIG. 6, is $$\frac{1}{m + k_m + k_c \frac{1}{S}}$$

all integrated with respect to time at 62, and the return feedback loop factor B is C. Using the loop transformation of FIG. 6 yields box 134a and algebraic rearrangement yields equivalent boxes 134b and 134c. Box 134c is substituted for its equivalent box 134 in FIG. 9, and the result is FIG. 11.

Figure 11:
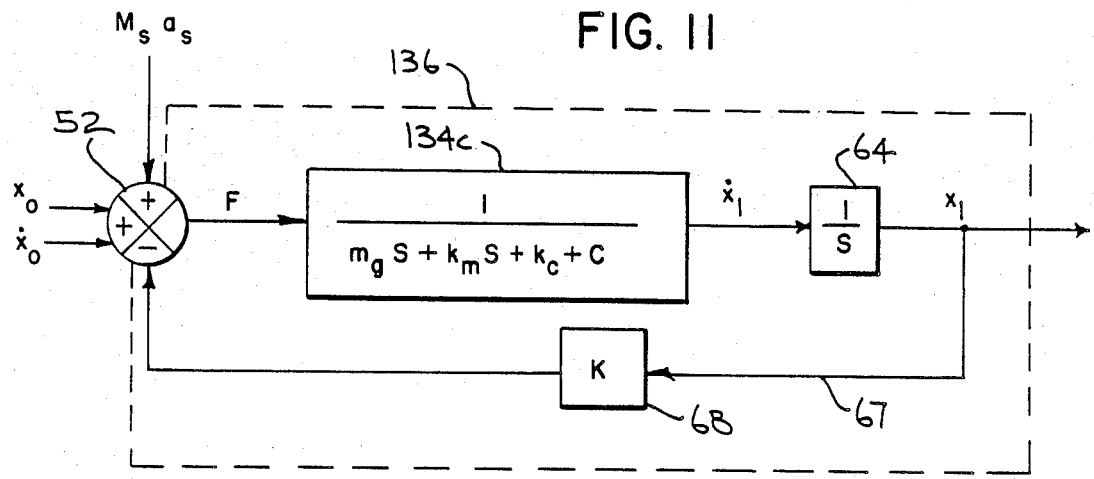
FIG. 11 is a further block diagram of FIG. 9.
Figures 12, 13:
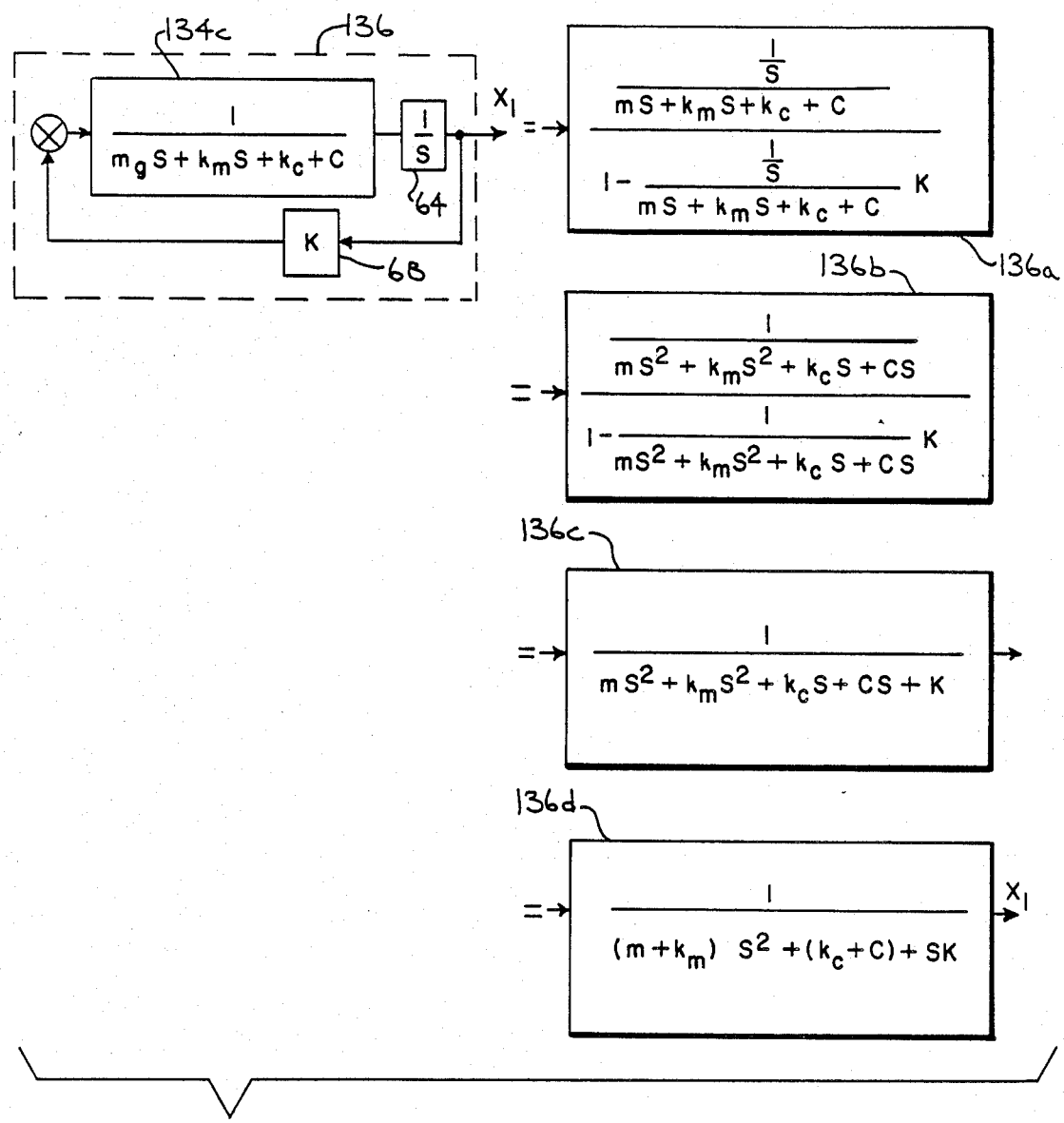
FIG. 12 is a block diagram of a portion of FIG. 11.
FIG. 13 is an equation resulting from FIG. 12.

In FIG. 11, the loop in dashed box 136 is shown in FIG. 12 with the forward loop factor A as shown, and the return feedback loop factor B equal to K. Using the loop transformation of FIG. 6 yields equivalent box 136a, and algebraic rearrangement yields equivalent boxes 136b, 136c and 136d for outputting displacement distance $x_1$, which is shown by the equation in FIG. 13. The distance or displacement $x_1$ of worktable 6 is thus equal to the input force $Kx_0 + C\dot{x}_0$+any other reaction forces F such as $M_s$ and $a_s$, divided by the quantity: (the mass m of the worktable plus the acceleration dynamic gain factor $k_m$) differentiated twice with respect to time—plus—(the inertial or dynamic damping gain factor $k_c$ plus the pumping or existent damping loss constant, which is proportional to velocity) differentiated with respect to time—plus—the spring constant K.

Referring to FIG. 14, there is shown a general case with body 150 of mass m supported on the floor 152 by support means 154 of spring constant K having a pumping loss or damping component C at 156. The force on block 150 is shown at the first equation in FIG. 15, namely: the mass m of the body times acceleration $\ddot{x}_1$—plus—damping or pumping constant C times velocity $\dot{x}_1$—plus—spring constant K times distance $x_1$. Algebraic rearrangement yields the second equation in FIG. 15 where the force is equal to: the mass m times the distance $x_1$ differentiated twice with respect to time—plus—damping constant C times the distance $x_1$ differentiated with respect to time—plus—spring constant K times displacement $x_1$. Solving for $x_1$ yields the last equation in FIG. 15.

Upon comparing the equation in FIG. 13 and the last equation in FIG. 15, it is seen that the mass m of FIG. 14 has been increased by the present invention to a dynamic mass of $m + k_m$. It is further seen that the pumping loss or damping coefficient C of FIG. 14 and the last equation of FIG. 15 has been increased to a dynamic or inertial damping coefficient of $k_c + C$. It is particularly noteworthy that the additional factors $k_m$ and $k_c$ are in the denominator of the fraction in FIG. 13, and hence reduce the value of $x_1$, and hence minimize displacement of the worktable.

FIG. 16 shows a variant of FIG. 14, taking into account floor motion by assigning the reference floor position at $x_0$ and a reference body position at $x_1$, and using like reference numerals for the remaining components with the subscript "a". The force equations are shown in FIG. 17, with the final equation the solution for $x_1$ with $F=0$. The floor displacement $x_0$ due to spring constant K and damping constant C is in the numerator in the last equation in FIG. 17. The co-pending application increases C in the denominator to $C+k_c$, FIG. 13, by feeding back integrated acceleration of body 150a with positive gain $k_c$ to inertially derive and increase dynamic damping of the body, without increasing the transmissibility of floor motion into the system. The term $k_c$ enables independent control of damping of the system. Furthermore, since $k_c$ can control damping, the pumping loss C can theoretically be eliminated or, as a practical matter, minimized as much as possible, which loss reduction is highly desirable, since this eliminates one of the floor motion coupling terms. The inertially derived damping term $k_c$ thus enables a substantial reduction in unwanted coupling between the floor and the body.

In its general form, the noted co-pending application system thus provides a seismic isolation system for a body 6 of mass m supported relative to a reference such as floor 10 and/or sidewall 96. Sensed acceleration is operatively coupled to linear forcers 74, 76, 94 and so on, to isolate the body by applying force against the acceleration regardless of the position of the body or variance thereof relative to the reference such as floor 10 or sidewall 96.

The noted co-pending application system is also useful for isolating a body subject to structural resonance, wherein force is applied to isolate the body against resonance induced acceleration, for example at a plurality of points between nodes. In a further use, the noted co-pending application system may be applied to a body having a first portion subject to structural resonance, and a second portion which may be subject to more, less or about the same structural resonance as the first portion, and wherein the force applying means applies force between the first and second portions, effectively using the second portion as a reference, for example where the second portion is relatively rigid and the first portion may flex relative thereto. The rigid body portion may be fixed to the floor or other reference, or may be isolated, immobilized or fixed, in accordance with the noted co-pending application system, such as for granite block 6, with the other body portion such as tower 38 being subject to flexure or resonance relative thereto, and with immobilizing force being applied between tower 38 and granite block 6 and/or an extension thereof or a reference. Whether the whole body or only a portion thereof is subject to structural resonance, the force applying means may apply force between such body and either a stationary or movable reference because it is only necessary that force be applied, i.e., the reference may be subject to substantially less structural resonance than the body or may be subject to about the same structural resonance as the body or may be subject to more structural resonance than the body. In the noted co-pending application system, the body is isolated regardless of movement or position or variance, of the reference relative to the body by effectively removing energy therefrom.

PRESENT INVENTION

In accordance with the present invention, a reaction mass RM is utilized, and force is applied between the reaction mass RM and body or worktable granite block 6. The reaction mass RM may be used additionally or alternatively to the above described embodiment. The reaction mass RM may be supported relative to a reference frame such as floor 10 and/or sidewall 96, or the reference mass RM may be supported relative to body 6. When the reference mass RM is supported relative to body 6, it is preferred that the reference mass be mounted to or otherwise supported by the linear forcer. The force equations and loops are the same as above, except that only the high frequency components from the vertical and horizontal accelerometers are used. In some embodiments, the reaction mass may be the solenoid plunger of the linear forcer.

Figure 18:
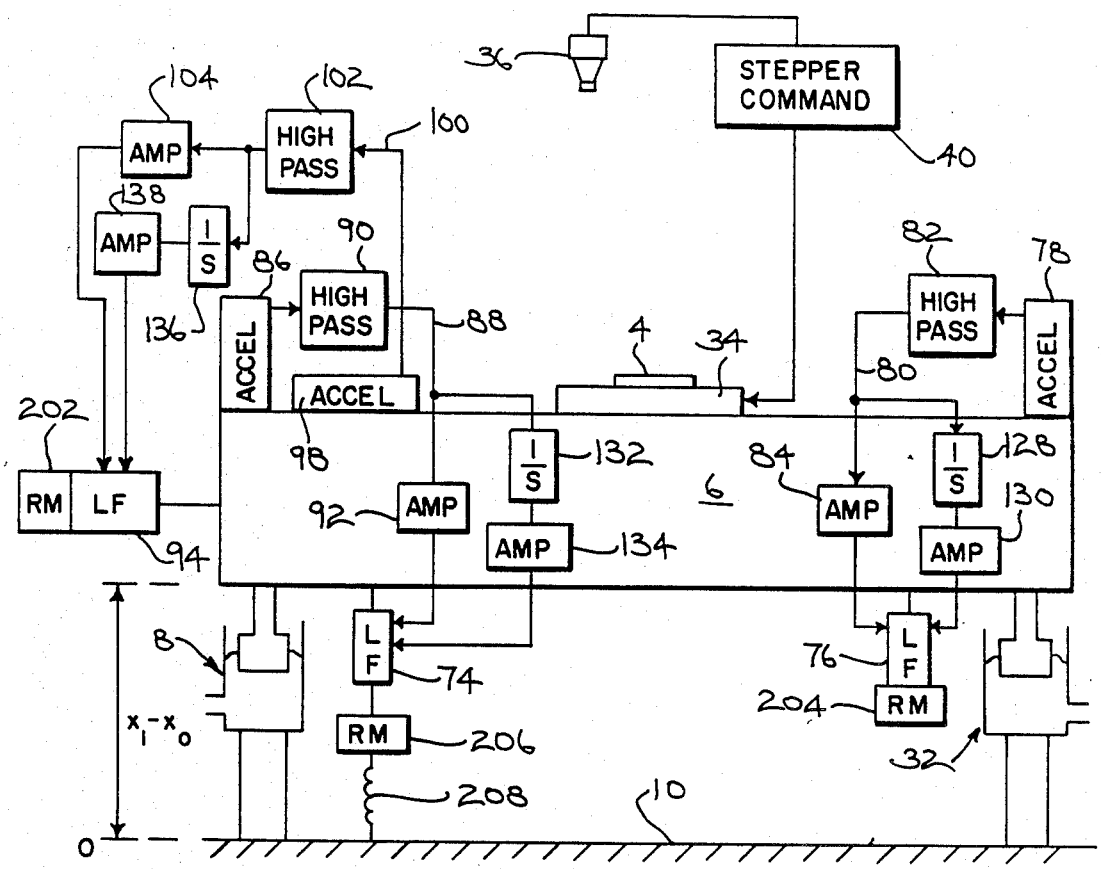
FIG. 18 is a schematic illustration of a microlithography system in accordance with the invention.
Figure 19:
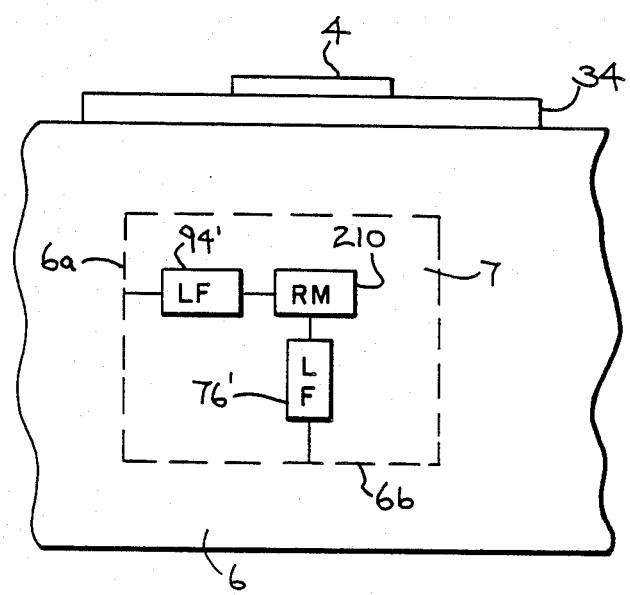
FIG. 19 is a schematic illustration of a portion of FIG. 18 showing a further embodiment.

FIGS. 18 and 19 use like reference numerals as the prior figures where appropriate to facilitate clarity. FIG. 18 shows a seismic isolation system for a body 6 of mass m. Linear forcer 94 applies a force between body 6 and a reaction mass 202. Accelerometer 98 is operatively coupled to body 6 to sense acceleration of the body, and is operatively coupled to linear forcer 94 via loop 100, as above, to isolate body 6 by applying force against sensed acceleration regardless of the position or variation of position of body 6 relative to reaction mass 202. As above, sensed acceleration is operatively coupled in feedback loop 100 to linear forcer 94 with a loop gain km to effectively increase the dynamic mass of body 6. The sensed acceleration is also integrated to velocity at 136 and operatively coupled in the feedback loop to linear forcer 94 to inertially derive and increase damping of body 6. Reaction mass 204 is likewise provided for vertical linear forcer 76 responsive to sensed vertical acceleration from accelerometer 78. Each of reaction masses 202 and 204 is supported relative to their respective linear forcers 94 and 76, and may in fact be a part of the linear forcer, such as the moving solenoid plunger, or may be attached and fixed to the frame or housing of the linear forcer. The reaction mass 202 and/or 204 is typically of significantly less mass than body 6, and upon activation of the respective linear forcer 94 and/or 76, the reaction mass is moved relative to body 6.

In an alternative, or in combination, the reaction mass such as 206 may be supported relative to a reference such as floor 10, for example by spring 208. In this form, both body 6 and reaction mass 206 are supported relative to floor 10. Reaction mass 206 may be supported only relative to floor 10, or relative both to floor 10 and to linear forcer 74.

Separate reaction masses such as 202 and 204 may be used for the horizontal and vertical linear forcers 94 and 76, respectively, or a single reaction mass 210 may be used, FIG. 19. In the exemplary embodiment in FIG. 19, an internal cavity or recess 7 is provided within body 6. Horizontal linear forcer 94' applies horizontal force to body 6 between recess sidewall 6a and reaction mass 210. Vertical linear forcer 76' applies vertical force to body 6 between recess bottom wall 6b and reaction mass 210. Reaction mass 210 is supported by linear forcers 76' and 94'. As an alternative to cavity or recess 7, reaction mass 210 and/or other reaction masses, may be supported on top of body 6, or may be suspended beneath body 6, etc.

As above, soft spring supports such as 8 and 32, FIG. 18, support body 6 on floor 10 for isolating body 6 from floor vibration. The feedback loop such as 100 and/or 80 has a gain $k_m$, and the dynamic mass of body 6 is increased by a factor of $m+k_m$ and the resonant frequency of body 6 is reduced by a factor of $m+k_m$. The resilient supports such as 8 and 32 have a spring constant K, and the dynamic mass of body 6 is increased and the resonant frequency is decreased without changing spring constant K. The resilient supports such as 8 and 32 have a damping constant C, as above. The sensed acceleration is also integrated, as noted, to velocity and operatively coupled in the respective feedback loop to the respective linear forcer with feedback loop gain $k_c$ to inertially derive and increase damping of body 6 without increasing damping constant C, further enabling reduction of damping constant C as desired. The loop gain between the accelerometer and the linear forcer is a factor of $k_m+k_c$ times the integral of sensed acceleration.

As above, the system of FIGS. 18 and/or 19 provides an add-on system for an existing soft spring isolated body. The soft spring such as 8 and/or 32 is inertially augmented with one or more reaction masses and one or more linear forcers having a substantially lower forcing capability than the soft spring and applying force between body 6 and the reaction mass at higher frequency above low frequency constant force. The force is applied between the reaction mass and the body against sensed acceleration of the body independently of movement and position of the body relative to a reference such as floor 10, to provide isolation independently of positional stabilization of body 6.

The present invention thus provides a method for reducing vibration transmissibility in a seismic isolation system, including a microlithography system, having a body 6 supported on a floor 10 by resilient support means such as 8 having a spring constant K for isolating body 6 from floor vibration. A resonant frequency of body 6 is reduced by increasing its dynamic mass without increasing its static mass and without changing spring constant K. The dynamic mass of body 6 is increased by sensing acceleration of body 6, and providing a reaction mass RM such as 202 and/or 204 and feeding back sensed acceleration in a feedback loop such as 100 and/or 80 with loop gain $k_m$ to a linear forcer 94 and/or 76 for applying force between reaction mass RM and body 6 and increase the dynamic mass of body 6 by a factor of $m+k_m$ and reduce the resonant frequency by a factor of $\sqrt{m+k_m}$.

It is recognized that various alternatives and modifications are possible within the scope of the appended claims.

We claim:

1. A seismic isolation system for isolating a body (6) of mass m from vibrations of a reference (10) comprising:
   a first reaction mass (206) capable of movement different from those of both said body and said reference;
   first force applying means (74) for applying a force between said first reaction mass and one of (a) said body and (b) said reference;
   support means (208) for supporting said first reaction mass relative to the other one of (a) said body and (b) said reference;
   accelerometer means (86) coupled to said body for sensing absolute inertial acceleration of said body and producing an acceleration signal accordingly:
   means receiving said acceleration signal for communicating it to said force applying means to control said force applying means to isolate said body by applying force against said acceleration.

2. The invention as in claim 1 and wherein said support means comprises resilient means and damping means.

3. The invention as in claim 1 and wherein said support means comprises spring means.

4. The invention according to claim 1 and further comprising:
   a second reaction mass (204) capable of movement different from that of both said body and said reference;
   second force applying means for applying a force between said body and said second reaction mass;
   means receiving said acceleration signal for communicating it to said second force applying means to control said second force applying means to isolate said body by applying force against said acceleration regardless of the position and motion of said body relative to said second reaction mass.

5. The invention according to claim 4 wherein said sensed acceleration is coupled in a feedback loop to said force applying means with a loop gain to effectively increase the dynamic mass of said body.

6. The invention according to claim 5 wherein said sensed acceleration is also integrated to velocity and coupled in a feedback loop to said force applying means to inertially drive and increase damping of said body.

7. The invention according to claim 4 wherein said body is supported relative to said reference, and said reaction mass RM is supported relative to said force applying means.

8. The invention according to claim 4 wherein said reaction mass is supported relative to said force applying means.

9. The invention according to claim 8 wherein said force applying means is a linear forcer, and said reaction mass RM is part of said linear forcer.

10. The invention according to claim 4 wherein each of said body and said reaction mass RM is supported relative to said reference.

11. A seismic isolation system comprising:
a body of mass m;
a reference;
support means supporting said body relative to said reference and having at least some resilience to allow relative movement between said body and said reference, and providing at least some damping of said movement;
a reaction mass means RM supported relative to said reference;
force applying means for applying a force between said body and said reaction mass RM;
accelerometer means coupled to said body to sense absolute inertial acceleration of said body;
feedback loop means coupling said sensed acceleration in a feedback loop to said force applying means to increase the dynamic mass of said body, and integrating said sensed acceleration to velocity and operatively coupling said velocity to said force applying means to inertially derive and increase damping of said body without increasing stiffness or damping of coupling support of said support means.

12. The invention according to claim 11 comprising:
first and second said force applying means, said first force applying means applying vertical force to said body, and said second force applying means applying horizontal force to said body;
first and second said accelerometer means, said first accelerometer means sensing vertical acceleration of said body, and said second accelerometer means sensing horizontal acceleration of said body;
first and second said feedback loop means, said first feedback loop means connecting said first vertical accelerometer means through high pass filter means to said vertical force applying means for passing higher frequency components above low frequency constant gravity induced acceleration;
said second feedback loop means connecting said second horizontal accelerometer means through high pass filter means to said second horizontal force applying means.

13. The invention according to claim 12 comprising a singular said reaction mass RM, wherein each of said first and second force applying means is applied between said singular reaction mass RM and said body.

14. The invention according to claim 13 wherein said singular reaction mass RM is supported by said first and second force applying means relative to said body.

15. The invention according to claim 12 comprising first and second reaction masses one for each of said vertical and horizontal force applying means.

16. The invention according to claim 11 wherein said support means comprises resilient support means supporting said body on a floor for isolating said body from floor vibration, and said feedback loop has a gain $k_m$ and the dynamic mass of said body is increased by a factor of $m+k_m$ and the resonant frequency of said body is reduced by a factor of $\sqrt{m+k_m}$.

17. The invention according to claim 16 wherein said resilient support means has a spring constant K, and wherein said dynamic mass is increased and said resonant frequency is decreased without changing said spring constant K.

18. The invention according to claim 17 wherein said resilient support means has a damping constant C, and wherein said sensed acceleration is also integrated to velocity and operatively coupled in a feedback loop to said force applying means with a feedback loop gain $k_c$ to inertially drive and increase damping of said body without increasing said damping constant C, and further enabling reduction of said damping constant C as desired, the loop gain between said accelerometer means and said force applying means being a factor of $k_m+k_c$ times the integral of said sensed acceleration.

* * * * *